United States Patent [19]

Carlson

[11] Patent Number: 5,284,920
[45] Date of Patent: Feb. 8, 1994

[54] FLUORINATED THERMOPLASTIC ELASTOMERS WITH IMPROVED BASE STABILITY

[75] Inventor: Dana P. Carlson, Chadds Ford, Pa.

[73] Assignee: E. I. Du Pont de Nemours and Company, Wilmington, Del.

[21] Appl. No.: 881,035

[22] Filed: May 11, 1992

Related U.S. Application Data

[63] Continuation-in-part of Ser. No. 488,096, Mar. 1, 1990, abandoned.

[51] Int. Cl.$^5$ ............................................. C08F 293/00
[52] U.S. Cl. ..................................... 525/276; 525/260; 525/263; 525/264; 525/273; 525/323; 525/312
[58] Field of Search ............... 525/260, 263, 264, 273, 525/276, 323; 526/229, 247, 250

[56] References Cited

U.S. PATENT DOCUMENTS

| 3,467,635 | 9/1969 | Brasen et al. | 260/80.76 |
| 3,859,259 | 2/1975 | Harrell et al. | 260/77.5 R |
| 4,035,565 | 7/1977 | Apotheker et al. | 526/249 |
| 4,148,982 | 4/1979 | Morozumi et al. | 526/58 |
| 4,158,678 | 6/1979 | Tatemoto et al. | 260/884 |
| 4,243,770 | 6/1981 | Tatemoto et al. | 525/331 |
| 4,487,882 | 12/1984 | Ueta et al. | 524/505 |
| 4,603,175 | 7/1986 | Kawachi et al. | 525/276 |
| 4,694,045 | 9/1987 | Moore | 525/276 |
| 4,861,836 | 8/1989 | Tatemoto et al. | 525/276 |
| 4,948,853 | 8/1990 | Logothetis et al. | 526/247 |
| 5,037,921 | 8/1991 | Carlson | 526/247 |

FOREIGN PATENT DOCUMENTS 60-19325 5/1985 Japan.
59405 11/1988 Japan.

Primary Examiner—Vasu S. Jagannathan

[57] ABSTRACT

The subject invention relates to segmented fluoropolymers of the A-B-A type where A is a crystallizable fluoropolymer segment, and B is a base-resistant elastomeric fluoropolymer segment, the segmented fluoropolymers being useful as thermoplastic fluoroelastomers which are highly resistant to attack by bases. The fluoroelastomers are useful, for example, in O-rings and shaft seals in internal combustion engines using aggressive oils and in oil well applications.

10 Claims, No Drawings

FLUORINATED THERMOPLASTIC ELASTOMERS WITH IMPROVED BASE STABILITY

CROSS-REFERENCE TO RELATED APPLICATION

This is a continuation-in-part of copending application Ser. No. 07/488,096, filed Mar. 1, 1990, now abandoned.

FIELD OF THE INVENTION

The subject invention relates to segmented fluoropolymers of the A-B-A type where A is a crystallizable fluoropolymer segment, and B is a base-resistant elastomeric fluoropolymer segment.

BACKGROUND OF THE INVENTION

Fluoroelastomer copolymers based on vinylidene fluoride, for example copolymers with hexafluoropropylene and, optionally, tetrafluoroethylene, are well-known, commercially available materials which possess unusually high chemical, thermal, and oxidative stability. They are readily cured by the use of diamines or by polyhydroxy compounds in combination with phase transfer agents such as quaternary ammonium or phosphonium salts. These crosslinking processes are possible because of the inherent susceptibility of vinylidene fluoride-containing polymers to attack by base. However, this sensitivity to base attack necessarily limits the utility of such fluoroelastomers to applications not requiring high resistance to base. Likewise, peroxide-curable fluoroelastomers based on vinylidene fluoride that also contain a peroxide-reactive curesite monomer, such as are described by Apotheker and Krusic in U.S. Pat. No. 4,035,565, are similarly reactive to basic materials In practice there are many applications, for example, in o-rings and shaft seals of internal combustion engines using aggressive oils and in oil well applications, in which resistance to base is required.

For these uses, special-purpose, base-resistant, peroxide-curable fluoroelastomers have been developed that do not contain vinylidene fluoride at all, (or if present, only in small amounts) and are based instead on tetrafluoroethylene. Such fluoroelastomers require either incorporation of special curesite monomers or treatment prior to peroxide cure to create radical-reactive sites. Thus copolymers of tetrafluoroethylene and propylene are known (U.S. Pat. No. 3,467,635) but require heat treatment (U.S. Pat. No. 4,148,982) for creation of unsaturation to facilitate peroxide cure. Random copolymers of tetrafluoroethylene, ethylene, perfluoroalkyl perfluorovinyl ethers and a curesite-monomer are described in U.S. Pat. No. 4,694,045. U.S. Pat. No. 3,859,259 and Japanese Examined Patent Kokoku 19325/1985 describe copolymers of tetrafluoroethylene and propylene that also contain vinylidene fluoride comonomer in low concentrations (5–30 mole percent), such that reactivity to base is not as severe as in the more highly fluorinated polymers described above.

Tatemoto, et al., in U.S. Pat. No. 4,158,678 describe the preparation of segmented thermoplastic fluoroelastomers, terminated by iodo-groups, that are composed of polymer or copolymer sequences, connected chemically, in the order of (1) a high-melting, crystallizable, fluorine-containing sequence, (2) a fluorine-containing elastomeric copolymer sequence based on vinylidene fluoride and at least one other fluorine containing monomer, and (3) a crystallizable, fluorine-containing sequence, wherein the iodo groups are liberated during emulsion polymerization carried out in the presence of chain transfer agents having the formula $RI_n$ where R is a fluorocarbon or chlorofluorocarbon residue having 1 to 8 carbon atoms, and n is 1 or 2. These materials may be formed into useful molded objects by typical thermoplastic processing procedures, such as extrusion and injection molding, and do not require chemical cross-linking steps, as do thermoset fluoroelastomers. However, because the elastomeric sequence of the segmented thermoplastic elastomer is based on vinylidene fluoride, these polymers suffer the same sensitivity to attack by strong base as do thermoset fluoroelastomers based on vinylidene fluoride.

SUMMARY OF THE INVENTION

The present invention provides segmented thermoplastic fluoroelastomers that are highly resistant to attack by base, and a process for their preparation.

Specifically, the present invention provides segmented thermoplastic elastomeric polymer having a sequence of three polymeric segments A-B-A wherein the sequence has an iodine group at each terminal carbon atom of the sequence and wherein the A segment is a crystallizable segment having a number average molecular weight of at least about 10,000 and which when crystallized has a melting range above about 150 C. and selected from the group consisting of homopolymerized units of tetrafluoroethylene (TFE); copolymerized units of TFE and ethylene, copolymerized units of TFE and perfluoro (alkylvinyl ether) PAVE; copolymerized units of TFE and vinylidene fluoride; copolymerized units of TFE and hexafluoropropylene; and copolymerized units of TFE, ethylene, and a member of the group consisting of propylene, isobutylene, hexafluoropropylene, pentafluoropropylene, 2-trifluoromethyl-3,3,3-trifluoropropylene-1, perfluoroalkyl ethylene, and PAVE; and wherein the B segment is an elastomeric segment having a number average molecular weight of at least about 30,000 and a glass transition temperature, Tg, below about room temperature, and comprises a polymeric chain having TFE as one comonomer copolymerized with monomer units selected from the group (a) propylene (P), wherein the TFE/propylene mole ratio is 45–70/30–55, (b) propylene and vinylidene fluoride ($VF_2$) wherein the TFE/P/$VF_2$ mole ratio is 5–65-/5–40/5–40, and (c) a $C_{2-3}$ hydrocarbon olefin and a vinyl ether of the formula $CF_2=CFO(CF_2)_nCF_3$ where n is 0–5 and wherein the TFE/olefin/ether mole ratio is 32–60/10–40/20–40.

DETAILED DESCRIPTION OF THE INVENTION

The base-resistant thermoplastic fluoroelastomers of this invention are A-B-A type block copolymers having iodine groups at terminal carbon atoms. The "A" segments are crystallizable fluoropolymer segments having a number average molecular weight of at least 10,000 and which when crystallized have melting ranges above about 150° C. Segment "B" is a base-resistant elastomeric fluoropolymer sequence having a minimum number average molecular weight of at least about 30,000 and a glass transition temperature, $T_g$, below about room temperature, preferably below 0° C. This structure is obtained by, in a first step, producing the elastomeric fluorocarbon segment "B" by conducting an emulsion polymerization in the presence of a radical source, under conditions to be described, in the presence of an iodine-containing molecule, $RI_2$, wherein R is a saturated perfluorocarbon or chloroperfluorocarbon alkylene group containing at least three carbon atoms between said iodo groups. Under radical polymerization conditions the iodo-compounds act as a chain transfer agent, resulting in a telomerization polymerization process in which a labile, iodine-containing chain end is formed, and the alkyl residue of the iodo-compound is attached to the other end of the polymer chain. When the iodo compound has two iodo groups, as herein defined, the fluoroelastomer chain segments "B" will therefore have iodo groups at each end when the polymerization is carried out under conditions to be described. In a second step the polymerization monomers of group "B" are removed and the monomers of group "A" substituted, whereby the telomerization polymerization process is resumed in the presence of a radical source to give the iodo-terminated segments "A" bonded to the terminal carbons of the "B" segment.

The iodine-containing compound, $RI_2$, may be exemplified by 1,3-diiodo-n-perfluoropropane, 1,4-diiodo-n-perfluorobutane, 1,3-diiodo-2-chloroperfluoro-n-propane, 1,5-diiodo-2,4-dichloroperfluoro-n-pentane, 1,6-diiodoperfluoro-n-hexane, 1,8-diiodoperfluoro-n-octane, 1,12-diiodoperfluorododecane, 1,16-diiodoperfluorohexadecane, 1,3-di(iododifluoromethyl)perfluorocyclobutane, and others that will be known to those skilled in the art. A preferred iodine-containing compound is 1,4-diiodo-perfluoro-n-butane.

The amount of iodo-compound that will be employed is high enough to give polymer having a predetermined desired molecular weight and having a preponderance of iodine end groups. The concentration of iodine in the polymer will fall in the range 0.1–0.5 weight %, and will depend upon the molecular weight of the segmented copolymer product of the polymerization. The lower limit of iodine content will correspond to approximately the upper practical limit of polymer viscosity. The upper limit on iodine content corresponds approximately to the lower limit of the molecular weights of individual segments necessary to give good physical properties to the segmented copolymer, as described hereinabove.

In the novel segmented thermoplastic fluoroelastomers of this invention the "B" segments have a number average molecular weight of at least 30,000 and a glass transition temperature, $T_g$, below room temperature, preferably below 0° C., and are copolymers of tetrafluoroethylene and certain copolymerizable comonomers. In one useful embodiment, the fluoroelastomer segment "B" is a copolymer of tetrafluoroethylene and propylene having 45–70 mole %, preferably 45–60 mole % tetrafluoroethylene units.

In another embodiment, the fluoroelastomer segment "B" contains copolymerized units of tetrafluoroethylene, propylene and vinylidene fluoride, present in relative ratios of 5–65/5–40/5–40 mole %, preferably 30–60/20–35/10–35 mole %, respectively.

In yet another useful embodiment, the fluoroelastomer segment "B" will contain 32–60 mole % TFE, 10–40 mole %, preferably 10–30 mole % ethylene or propylene units, and 20–40 mole %, preferably 25–40 mole % perfluoro(alkyl vinyl ether) units of the formula $CF_2=CFO(CF_2)_nCF_3$, where n is 0–5. A preferred perfluoro(alkyl vinyl ether) is perfluoro(methyl vinyl ether), hereafter sometimes referred to as PMVE, because it is more readily polymerizable to allow preparation of high molecular weight fluoroelastomers. Other representative perfluoro(alkyl vinyl ethers) are disclosed in U.S. Pat. No. 4,694,045, and are incorporated herein by reference. To obtain fluoroelastomers with lower glass transition temperatures, up to about 5 mole % of perfluoro(alkoxyalkyl vinyl ether) units can be substituted for the perfluoro(alkyl vinyl ether) units and, therefore the term "perfluoro(alkyl vinyl ether)" as used herein is intended to include those monomers that also contain minor amounts of up to about 5 mole % perfluoro(alkoxyalkyl vinyl ethers). Representative perfluoro(alkoxyalkyl vinyl ethers) wherein the alkoxy and alkyl groups each contain 1–5 carbon atoms are disclosed in U.S. Pat. No. 4,694,045 and are included herein by reference.

The crystallizable fluoropolymer segments "A", when crystallized, will have a melting range above at least 150° C., preferably above 200° C., will have number average molecular weight of at least 10,000 and will be comprised of homopolymerized units of tetrafluoroethylene or polymerized units of tetrafluoroethylene and one or more monomer units copolymerizable therewith as described below. Thus, in one embodiment the "A" segment may be a polytetrafluoroethylene segment. In other embodiments the "A" segment may be comprised of copolymerized units of tetrafluoroethylene and up to 25 mole % vinylidene fluoride, up to 10 mole % hexafluoropropylene, or up to 10 mole % of perfluoro(alkyl vinyl ether) or perfluoro(alkoxyalkyl vinyl ether) where the alkyl or alkoxy groups contain 1–6 carbon atoms. Perfluoro(methyl vinyl ether) and perfluoro(propoxypropyl vinyl ether) are preferred vinyl ethers. The "A" segment may also be comprised of copolymerized units of tetrafluoroethylene, ethylene and up to 10 mole % of monomer units selected from the group propylene, isobutylene, hexafluoropropylene, pentafluoropropylene, 2-trifluoromethyl-3,3,3-trifluoropropylene-1, perfluoroalkyl ethylenes where the alkyl group contains 1–12 carbon atoms and perfluoro(alkyl vinyl ether) or perfluoro(alkoxyalkyl vinyl ether) where the alkyl or alkoxy group contains 1–5 carbon atoms. Preferably the alkyl vinyl ether is perfluoro(methyl vinyl ether) or perfluoro(propoxypropyl vinyl ether). A preferred "A" segment is comprised of copolymerized tetrafluoroethylene and ethylene in mole ratios of 65–50/35–50.

The iodide terminated fluoroelastomer segments (B) of the thermoplastic elastomer compositions of this invention are prepared first using a semi-batch, emulsion polymerization process in which the mole ratio of iodide chain transfer agent to initiator is in the range of about 2/1 to 20/1 (preferably about 5/1 to 20/1). Higher ratios are not necessary and are impractical because the rate of polymerization is too low for commercial importance. Lower ratios give polymers with too few iodine end groups for preparation of segmented thermoplastic fluoroelastomers with desirable properties. The amount of iodide reagent added to the polymerization will depend on the molecular weight desired for the fluoroelastomer segment as well as the amount of polymer to be produced. The iodine concentration in the fluoroelastomer segments can vary from about 0.1 to 0.85% but, preferably, should be in the range from about 0.2 to 0.5%. The amount of fluoroelastomer in the aqueous dispersion can vary but should be in the range of about 5 to 25% solids (preferably 15 to 20%). Below this level, the polymer is difficult to recover from the dispersion. Above this preferred range, agglomeration in the autoclave can occur leading to inhomogeneous polymer products. Therefore, the amount of iodide reagent charged to the autoclave will be determined by these two considerations.

After the preparation of the iodine terminated fluoroelastomer dispersion, the monomers used in the preparation of the fluoroelastomer are vented from the autoclave and replaced with the monomers needed to make the fluoroplastic segments. This second reaction sequence can either be carried out immediately following the preparation of the fluoroelastomer segment or later as long as the dispersion of the fluoroelastomer is not coagulated. Usually, a small amount of additional initiator solution is added to start the polymerization of the thermoplastic segments. The mole ratio of iodide to initiator usually remains the same as in the preparation of the fluoroelastomer segment.

Initiators for the chain transfer polymerizations of this invention are the same as used in conventional fluoroelastomer polymerizations. These include organic and inorganic peroxides as well as azo compounds. Typical initiators include persulfates, peroxycarbonates, peroxyesters and the like. The preferred initiator is ammonium persulfate (APS). APS can either be used by itself or in combination with reducing agents such as sulfites and the like. The amount of initiator added to the polymerization is set by the amount of iodide reagent charged in order to maintain the desired iodide/initiator ratio.

In the case of emulsifiers for this process, salts of long chain fluorocarbon acids are preferred. A typical fluorocarbon dispersing agent used in this process is ammonium perfluorooctanoate (FC-143, 3M Co.). The amount of dispersing agent needed depends upon the surface active effect of the particular agent being used. When FC-143 is used, the preferred amount is in the range of 0.2% of the aqueous charge.

The temperature of the polymerization can vary from about 25° to 100° C. depending upon the nature of the initiator used and the particular polymers being prepared. However, with APS initiator, a temperature of 70° to 90° C. is preferred and 80° C. is most preferred. Higher temperatures can be used, in some cases, but undesirable side reactions such as branching and monomer rearrangements (e.g., rearrangement of perfluoro(alkyl vinyl ether) to acid fluoride) can occur.

The polymerization pressure will depend upon the vapor pressure of the monomers needed to sustain a polymerization rate of about 3 to 30 g/liter-hour (preferably between about 5 to 15 g/liter-hour). Below the desired rate, polymers with the desired molecular weight either cannot be prepared at all or the time required is too long to be practical. At higher than the specified rate of polymerization, undesired coupling reactions can occur which lead to broad molecular weight distributions. Preparation of the elastomeric copolymer segments herein described at the preferred temperatures of 70°-90° C. requires pressures in excess of about 2.0 MPa (300 psi) before the desired rates of polymerization are obtained. Pressures in the range of 2.6 to 2.7 MPa (380-400 psi) are preferred. In contrast, it has been found that, for preparation of the elastomeric copolymer segments of this invention, little or no polymerization occurs at a monomer pressure of 200 psi (1.4 MPa) at 80° C., if the temperature and iodide/initiator ratio are in the ranges specified above, while vinylidene fluoride copolymers can readily be prepared at 200 psi and even lower pressures. On the other hand, the pressure requirements for preparation of the thermoplastic, crystallizable segments described herein are not critical, and depending upon the monomers used, the pressure will usually be in the range of about 1.0 to 2.7 MPa (145-400 psi).

A fluorocarbon solvent can be added to the emulsion polymerization mixture which can somewhat lower the pressure required to carry out the polymerization reaction. For example, 1,1,2-trichloro-1,2,2-trifluoroethane (F-113) added to the polymerization mixture at about 10-20% (wt) of the aqueous charge can result in a reduction of the vapor pressure of the mixture of about 0.6 to 0.7 MPa. The presence of the F-113 does not change the nature of the polymer produced or stability of the emulsion obtained Other fluorocarbon solvents can also be used for this same function as long as they have no chain transfer activity and have a high solubility for the monomers being used.

The thermoplastic segmented fluoroelastomers of this invention will have an elastomeric segment "B" having chemically attached crystallizable fluoropolymer segments "A" at the fluoroelastomer segment chain ends. Above the melting ranges of the crystallizable segments "A" the segmented polymer will be a viscous fluid that can be molded and shaped by conventional thermoplastic processing procedures such as extrusion and injection molding. Such processes have well-known advantages such as low processing costs, short cycle times, and the ability to recycle reject molding. Below the melting point ranges of the segments "A", each segment "A" will be cocrystallized with many other "A" segments, and will thus limit the range of molecular motions available to the segments "B". The fluoroelastomer segment thus behaves as though it were crosslinked, and, indeed shows the desirable features of a crosslinked fluoroelastomer such as enhanced modulus, tensile strength, compression set and resistance to nonpolar solvents. In addition, the novel thermoplastic fluoroelastomers described herein also have the important property of being highly resistant to organic and inorganic bases. If desired, the molded thermoplastic fluoroelastomer may be permanently crosslinked by exposure to ionizing radiation.

The following examples illustrate useful embodiments of this invention. The abbreviations herein have the following meanings: tetrafluoroethylene—TFE; vinylidene fluoride $VF_2$; hexafluoropropylene—HFP; perfluoro(methyl vinyl ether) PMVE; propylene—P; ethylene—E. The compositions of the elastomeric segments were determined by Fourier transform infra red (FTIR) techniques.

Samples were prepared for physical testing by compression molding 0.025 cm thick specimens at 270° C., and could be remolded, as desired. Tensile properties were measured according to ASTM D-412; compression set was determined according to ASTM D-395, method B, using piled up discs obtained from the pressed sheet. The specimens were also permanently crosslinked by exposure to 15 mrad of ionizing radiation and tested. The resistance to solvents and butylamine were estimated by determination of the percent weight gain after immersion at room temperature for 3 days.

EXAMPLES

Example 1

(a) TFE/E/PMVE Terpolymer

A 4000 mL stainless autoclave was evacuated and purged with nitrogen and then was charged with 2600 mL of deionized, deoxygenated water in which was dissolved 5.6 g. of ammonium perfluorooctanoate surfactant (FC-143, 3M Co.). The reactor was then pressured to about 0.2 MPa (30 psi) with the "start-up monomer" mixture which had the following composition: 21 mole % TFE and 79 mole % PMVE. The autoclave was vented off to about 0.03 MPa (5 psi). The pressuring and venting was repeated 2 more times. Then the autoclave was heated to 80° C. while stirring at 600 RPM. The autoclave was then pressured to 2.66 MPa (386 psi) with the "start-up monomer" mixture described above. To start the polymerization, the autoclave was charged with 10 mL of a 1% solution of APS in $H_2O$. After about 20 min., the pressure in the autoclave had decreased to about 2.63 MPa (382 psi). At this time, 3.6 g of 1,4 diiodoperfluorobutane, dissolved in 36 mL of 1,1,2-trichloro-1,2,2-trifluoroethane, was added. The autoclave was maintained at a pressure of about 2.62 MPa (380 psi), during the course of the polymerization, by regular addition of the "make-up monomer" mixture. The "make-up monomer" mixture had the following composition: 50 mole % TFE, 25 mole % ethylene and 25 mole % PMVE. After 2 hours reaction time, an additional 10 mL of 1% APS solution was added. The polymerization was allowed to continue for a total of 27 hours during which time 667 g of the make-up monomer mixture was added. Also, during this period an additional 60 mL of 1% APS was added. The unreacted monomers were vented from the autoclave and the polymer dispersion was discharged into a large polyethylene bottle. The pH of the dispersion was 2.6 and it contained 24.0% solids.

The fluoroelastomer was isolated from 500 mL of the above dispersion by coagulating with potassium aluminum sulfate solution. The coagulated polymer was separated from the supernate by filtration and then washed 3 times by high speed stirring in a large blender. Finally, the wet crumb was dried in a vacuum oven at 70° C. for 40 hours. The recovered, dry polymer from the 500 mL aliquot weighed 130 grams. The composition of the fluoroelastomer was as follows: 45 mole % TFE, 18.7 mole % ethylene and 36.3 mole % PMVE. The polymer contained 0.15% iodine and had a Mooney viscosity, ML-10, measured at 121° C., of 24. The glass transition temperature was −16° C., as determined by differential scanning calorimetry (DSC).

(b) E/TFE::TFE/E/PMVE::E/TFE Segmented Polymer

A 4 liter autoclave was charged with 1000 mL of the polymer dispersion prepared in (a). The autoclave was evacuated and purged 3 times with nitrogen, then 3 times with the "start-up" monomer mixture of the following composition: 72 mole % TFE and 28 mole % ethylene. The clave was then heated to 80° C. and pressured to 2.4 MPa (350 psi) with the "start-up monomer" mixture. The polymerization was then initiated by addition of 10 mL of 1% APS solution. The pressure was kept constant by addition of the "make-up monomer" mixture which had the composition 53 mole % TFE and 47 mole % ethylene. A total of 100 g of the "make-up monomer" mixture was added in a 3 hour reaction time. The monomers were then vented off and the segmented polymer dispersion was discharged from the reactor. The dispersion contained 29.2% solids. The segmented polymer was isolated from the dispersion in the same manner as described for the fluoroelastomer above. A total of 300 g of polymer was recovered.

DSC analysis of the segmented polymer indicated a glass transition temperature of −16° C. for the fluoroelastomer segment and a melting endotherm maximum at 245° C. for the thermoplastic segments. The iodine content of the polymer was 0.13% and the melt index (ASTM D-2116 using a 10 kg wt at 275° C.), was 2.2 g/10 min. Physical properties and chemical resistance of sample compression molded at 270° C. are given in Table 1.

Example 2

(a) TFE/E/PMVE Terpolymer

The conditions in example 1(a) were repeated except that the "make-up monomer" mixture had the composition 45 mole % TFE, 28 mole % ethylene, and 27 mole % PMVE. The total polymerization time was 31 hours. The polymer dispersion had PH of 2.5 and contained 21.1% solids. A 500 mL aliquot of the dispersion was coagulated with potassium aluminum sulfate as before. The washed and dried polymer from this sample weighed 110 g and had the composition 44.2 mole % TFE, 19.4 mole % ethylene, and 36.5 mole % PMVE. The Mooney viscosity, ML-10, measured at 121° C., was 19.0. The iodine content of the polymer was 0.19%.

(b) E/TFE::TFE/E/PMVE::E/TFE Segmented Copolymer

The conditions in example 1(b) were repeated using 1000 mL of dispersion prepared in (a). The polymerization was carried out at 70° C. for 3.0 hours. The initiator charge was 20 mL of 0.2% APS solution. The "make-up monomer" mixture had the composition 50 mole % TFE and 50 mole % ethylene. A total of 67% of the TFE/ethylene monomer mixture was reacted. The resulting polymer dispersion contained 26.1% solids. After coagulation and washing and drying the segmented polymer, a total of 296 g was recovered. DSC analyses indicated a glass transition temperature of −14° C. and a melting endotherm maximum at 251° C. The polymer had a melt index, measured at 275° C., of 3.5 g/10 min. Physical properties of sample compression molded at 270° C. are given in Table 1.

Example 3

(a) TFE/P/VF$_2$ Terpolymer

The conditions in example 1(a) were repeated except that the "start-up monomer" and the "make-up monomer" mixtures had the following compositions, respectively: 48 mole % TFE, 18 mole % propylene, 34 mole % VF$_2$ and 50 mole % TFE, 30 mole % propylene, 20 mole % VdP. The polymerization was started by adding 30 mL of 1% APS solution. The polymerization was carried out for 30 hours during which time 415 g of "make-up monomer" mixture was added to maintain the pressure at 2.76 MPa. Additional 10 mL portions of the 1% APS solution were added every 3 hours during the polymerization run. The polymer dispersion contained 12.3% solids and had a PH of 2.5. A 500 mL portion of the dispersion was coagulated, washed and dried as described in example 1(a). The resulting dry polymer weighed 62 g and contained 0.49% iodine. The Mooney viscosity, ML-10, measured at 121° C., was 4.0.

(b) E/TFE::TFE/P/VF$_2$::E/TFE Segmented Polymer

The conditions in example 2(b) were repeated using 1000 mL of dispersion prepared in (a). The polymerization was carried out at 70° C. for 4.5 hours during which time 40 g. of the TFE/ethylene monomer mixture was added. The resulting polymer dispersion contained 15.2% solids. After coagulation and washing and drying the segmented polymer, a total of 160 g was recovered. DSC analysis indicated a glass transition temperature of −13° C. and a melting endotherm maximum at 262° C. The iodine content was 0.40%. Physical properties of sample compression molded at 270° C. are given in Table 1.

Example 4

(a) TFE/P Copolymer

The conditions in example 1(a) were repeated except the "start-up monomer" mixture had the following composition: 79 mole % TFE and 21 mole % propylene. The "make-up monomer" mixture had the composition 55 mole % TFE and 45 mole % propylene. After the autoclave was pressured to 2.76 MPa (400 psi) with the "start-up monomer" mixture, 10 mL of 1% APS solution was added. The diiodide solution was added after the pressure decreased to 2.72 MPa. The pressure was maintained at 2.76 MPa by addition of the "make-up monomer" mixture. The run was allowed to proceed for 30 hours during which time a total of 540 g of "make-up monomer" mixture was added. An additional 70 mL of 1% APS solution was also added in 10 mL increments. The polymer dispersion contained 16.2% solids and had a pH of 2.6. A 500 mL portion of the dispersion was coagulated, washed and dried as described in example 1(a). A total of 78 g of TFE/propylene copolymer rubber, with the composition 55 mole % TFE and 45 mole % propylene, was recovered. The iodine content was 0.35% and the Mooney viscosity, ML-10, measured at 121° C., was 70. The glass transition temperature was −1° C.

(b) E/TFE::TFE/P::E/TFE Segmented Polymer

The conditions in example 2(b) were repeated using 1000 mL of dispersion prepared in (a). The polymerization was carried out at 70° C. for 4.0 hours during which time 60 g. of the TFE/ethylene monomer mixture was added. The resulting polymer dispersion contained 19.6% solids. After coagulation and washing and drying the segmented polymer, a total of 220 g was recovered. DSC analysis indicated a glass transition temperature of −1° C. and a melting endotherm maximum at 267° C. The iodine content was 0.27%, and the melt index, using a 2 kg weight, was 5.9 g/10 min. Physical properties and chemical resistance of sample compression molded at 270° C. are given in Table 1.

Comparative Example A

Example 1(a) was repeated except that the reactor was only pressured to 1.38 MPa (200 psi) with the "start-up monomer" mixture. Then, 10 ml of 1% APS initiator solution was added. The diiodide solution was added and the reaction was allowed to proceed for a total of 13.5 hours during which time an additional 60 ml of the 1% APS solution was added in 10 ml increments. At the end of this time, only 42 g of "make-up monomer" mixture had reacted. The unreacted monomers were vented off and the product examined. The aqueous product contained 3.4% solids and had a pH of 2.4. Upon coagulation, washing and drying the coagulated product, 63 g of sticky, low molecular weight polymer was obtained. Analysis of this product indicated that it contained 2.45% iodine.

Comparative Example B (a) VF$_2$/PMVE/TFE copolymer

The procedure of example 1(a) was repeated except that the autoclave was pressured to 1.03 MPa (150 psi) with a "startup" monomer mixture composed of 52.4 mole % VF$_2$, 31.3 mole % PMVE and 16.3 mole % TFE. The polymerization was started by adding 20 mL of a 0.2% APS solution. After the pressure in the autoclave decreased to 1.0 MPa, 3.6 g of 1,4-diiodoperfluorobutane in 36 mL of F-113 was added. The autoclave was maintained at a pressure of 1.13 MPa by addition of a "make-up monomer" mixture composed of 73.4 mole % VF$_2$, 18 mole % PMVE and 8.8 mole % TFE. The polymerization was carried out for 16 hrs during which time 667 g of the "make-up monomer" mixture was added. Also, an additional 30 mL of the APS catalyst solution was added in three 10 mL portions over the course of the polymerization. The resultant polymer emulsion contained 21.7% solids and had a pH of 3.7. A 500 mL portion of the emulsion was coagulated, washed and dried. The isolated elastomer weighed 111 g, contained 0.29% iodine, and had a composition of 73% VF$_2$, 17.2% PMVE and 9.8% TFE, on a molar basis. The Mooney viscosity, ML-10, was 5.0.

(b) E/TFE::VF$_2$/PMVE/TFE::E/TFE

The conditions of Example 2(b) were repeated, using 1000g mL of the emulsion prepared in part (a) of this example. The polymerization was started by adding 10 mL of 0.2% APS solution, and was carried out at 80° C., during which time 100 g TFE/ethylene monomer mixture (1:1 mole ratio) was added. The resulting polymer contained 28.8% solids. After coagulating and drying a total of 310 g of polymer was recovered having an iodine content of 0.21%. It had a glass transition temperature of −33° C. and a melting range maximum at 254° C. Physical properties and chemical resistance of sample compression molded at 270° C. are given in Table 1.

Reference Example A

A commercially available segmented copolymer marketed by Daikin Chemical Industries under the tradename Dai-el ® T-530, believed to have an elastomeric segment composed of VF$_2$, HFP and TFE units (in a weight ratio 35/40/25, respectively) and crystallizable E/TFE (50/50 w/w) segments, and having a T$_g$ of −8° C. and a melting range maximum of 222° C., was molded by the procedures described above, and its chemical resistance determined as shown in Table 1.

I claim:

TABLE I

| EXAMPLE | 1 | 2 | 3 | 4 | Comp. B | Ref. A |
|---|---|---|---|---|---|---|
| Compression molded | | | | | | |
| $M_{100}$ (MPa) | 3.4 | 3.4 | 7.5 | 7.8 | 4.8 | — |
| $T_B$ (MPa) | 14.5 | 14.2 | 8.6 | 14.2 | 13.4 | — |
| $E_B$ (%) | 510 | 470 | 190 | 300 | 460 | — |
| Irradiated, 15 MRad | | | | | | |
| $M_{100}$ (MPa) | 5.3 | 4.5 | 7.2 | 8.5 | 5.2 | — |
| $T_B$ (MPa) | 16.9 | 15.0 | 17.6 | 21.7 | 23.4 | — |
| $E_B$ (%) | 270 | 265 | 275 | 255 | 340 | — |
| Compression Set (%) (pellets, 150° C./70 hr) | 37 | 32 | 40 | 52 | 35 | — |
| Chemical Resistance: | % wt. gain after 3 days at room temperature | | | | | |
| acetone | 3.6 | — | — | 7.3 | 52.3 | 87.1 |
| methanol | 0.0 | — | — | 0.2 | 2.1 | 0.8 |
| dimethyl formamide | 0.5 | — | — | 1.9 | 42.3 | 48.2 |
| toluene | 1.1 | — | — | 8.4 | 4.1 | 2.0 |
| F-113 | 100.0 | — | — | 52.0 | 34.1 | 48.4 |
| butylamine | 1.9 | — | — | 6.6 | decomp | decomp |

1. A composition comprising a segmented thermoplastic elastomeric polymer having a sequence of three polymeric segments A-B-A wherein the sequence has an iodine group at each terminal carbon atom of the sequence and wherein the A segment is a crystallizable segment having a number average molecular weight of at least about 10,000 and which when crystallized has a melting range above about 150° C. and selected from the group consisting of homopolymerized units of tetrafluoroethylene (TFE); copolymerized units of TFE and ethylene, copolymerized units of TFE and perfluoro (alkylvinyl ether) (PAVE); copolymerized units of TFE and vinylidene fluoride; copolymerized units of TFE and hexafluoropropylene; and copolymerized units of TFE, ethylene, and a member selected from the group consisting of propylene, isobutylene, hexafluoropropylene, pentafluoropropylene, 2-trifluoromethyl-3,3,3-trifluoropropylene-1, perfluoroalkyl ethylene, and PAVE; and wherein the B segment is an elastomeric segment having a number average molecular weight of at least about 30,000 and a glass transition temperature, Tg, below about room temperature, and comprises a polymeric chain having TFE as one comonomer copolymerized with monomer units selected from the group consisting of (a) propylene (P), wherein the TFE/propylene mole ratio is 45-70/30-55, (b) propylene and vinylidene fluoride ($VF_2$) wherein the TFE/P/$VF_2$ mole ratio is 5-65/5-40/5-40, and (c) a $C_{2-3}$ hydrocarbon olefin and a vinyl ether of the formula $CF_2=CFO(CF_2)_nCF_3$ where n is 0-5 and wherein the TFE/olefin/ether mole ratio is 32-60/10-40/20-40.

2. A composition of claim 1 wherein the B segment comprises copolymerized units of TFE and propylene in the mole ratios 45-60/55-40.

3. A composition of claim 1 wherein the B segment comprises copolymerized units of TFE, propylene and $VF_2$ in the mole ratios 30-60/20-35/10-35.

4. A composition of claim 1 wherein the B segment comprises copolymerized units of TFE, ethylene and PAVE in the mole ratios 32-60/10-30/25-40.

5. A composition of claim 4 wherein the PAVE has the formula $CF_2=CFO(CF_2)_nCF_3$ where n is 0-5.

6. A composition of claim 5 wherein the PAVE is perfluoro(methyl vinyl ether).

7. A composition of claim 1 wherein the segment A is a copolymer of TFE and up to 50 mole % ethylene.

8. A composition of claim 1 wherein the segment A is a copolymer of TFE and up to 10 mole % PAVE.

9. A composition of claim 8 wherein the PAVE is selected from perfluoro(alkyl vinyl ether) and perfluoro(alkoxyalkyl vinyl ether) where the alkyl and alkoxy groups contain 1-6 carbon atoms.

10. A composition of claim 8 wherein the PAVE is selected from perfluoro(methyl vinyl ether) and perfluoro(propoxypropyl vinyl ether).

* * * * *